United States Patent [19]

Antson et al.

[11] 4,416,933

[45] Nov. 22, 1983

[54] THIN FILM ELECTROLUMINESCENCE STRUCTURE

[75] Inventors: Jorma O. Antson; Sven G. Lindfors, both of Espoo; Arto J. Pakkala, Evitskog; Jarmo I. Skarp, Helsinki; Tuomo S. Suntola; Markku A. Ylilammi, both of Espoo, all of Finland

[73] Assignee: Oy Lohja Ab, Virkkala, Finland

[21] Appl. No.: 346,872

[22] Filed: Feb. 8, 1982

[30] Foreign Application Priority Data

Feb. 23, 1981 [FI] Finland ................................ 810547

[51] Int. Cl.[3] ...................... H05B 33/12; B32B 17/06

[52] U.S. Cl. .................................. 428/216; 313/499; 313/503; 313/505; 313/506; 313/509; 313/510; 427/66; 428/336; 428/432; 428/698; 428/699; 428/701; 428/917

[58] Field of Search ............... 428/917, 701, 699, 698, 428/432, 216, 336; 427/66; 350/357; 313/503, 499, 505, 506, 509, 510

[56] References Cited

U.S. PATENT DOCUMENTS 3,133,222 5/1964 Cerulli ................................ 313/503
3,315,111 4/1967 Joffe .................................. 313/503

FOREIGN PATENT DOCUMENTS 1543233 3/1979 United Kingdom ................ 428/917

OTHER PUBLICATIONS

*IBM Tech. Disclosure Bulletin, vol.* 22, (No. 4), Sep. 1979, "Direct Current Thin Film Electroluminescence Device".

*Primary Examiner*—Ellis P. Robinson
*Attorney, Agent, or Firm*—Fitzpatrick, Cella, Harper & Scinto

[57] ABSTRACT

Described herein is a thin film electroluminescence structure comprising a substrate layer (1), a first electrode layer (2), a second electrode layer (10) disposed at a distance from the first electrode layer (2), and a luminescence layer (6) disposed between the first (2) and the second electrode layer (10). Additional layer structures (3 to 5, 7 to 9) are disposed between the electrode layers (2 and 10) and the luminescence layer (6), said structures having current limiting and chemically protecting functions. The invention is based on the idea that it is possible to separate the functions of a chemical barrier and a current limitation from each other, whereby the production of the chemical protection in itself takes place without voltage losses, in other words, with a material whose electrical conductivity is essentially higher than the electrical conductivity of the current limiter. Hence, there is a layer (3, 8) functioning as a chemical barrier on both sides of the luminescence layer (6), whereas there is a current limiting layer only on one side, either as a separate resistive or dielectric layer (8), or as integrated in the material layer constituting the chemical barrier.

6 Claims, 8 Drawing Figures

THIN FILM ELECTROLUMINESCENCE STRUCTURE

The present invention concerns a thin film electroluminescence structure comprising at least one substrate layer made of, e.g., glass, at least one first electrode layer, at least one second electrode layer disposed at a distance from the first electrode layer, a luminescence layer disposed between the first and the second electrode layer, and additional layer structures disposed between the electrode layers and the luminescence layer and having current limiting and chemically protecting functions.

Electroluminescence as a phenomenon has been known ever since the 1930's. The reason why practical applications have not been created for it has been mainly that the durability and the reliability of electroluminescence structures has been hard to bring up to the standard of practical requirements. Thin film electroluminescence components have been studied more intensively from the early 60's. The principal luminescence material has been zinc sulfide, ZnS, which has been typically prepared into the thin film form by means of the vacuum evaporation technique. As a material, zinc sulfide is a semiconductor having a large forbidden gap (about 4 eV), whose specific conductivity is relatively low ($\approx 10^9 \Omega$cm).

The creation of electroluminescence requires that there are suitable activators in the zinc sulfide material and that a current of a certain magnitude is made to flow therein. The production of a sufficient current density in unalloyed zinc sulfide requires a very strong electric field (of the order of $10^6$ V/cm). When influencing across a thin film, the use of such an electric field requires very high electric and structural homogeneity from the zinc sulfide material. As, on the other hand, the conductivity of zinc sulfide increases with a rising temperature, the zinc sulfide thin film is, under the strong-field conditions concerned, highly sensitive to so-called thermal breakdown. Thermal breakdown is produced when the current intensity increases at some point of the material and causes extra heating. The increased temperature then increases the conductivity of the point concerned, which again increases the current as a positive feed-back.

A thin film structure based on an unalloyed zinc sulfide thin film alone has not proved usable either, and as an essential improvement a structure was suggested (W. J. Harper, *J. Electrochem. Soc.,* 109, 103 (1962)) in which thermal breakdown was prevented by means of a series impedance limiting the current flowing through the zinc sulfide film. As the series impedance concerned is capacitive, an AC luminescence structute is commonly spoken of. In the series impedance concerned is resistive, the flow of direct current is also permitted in the structure, in which case a DC luminescence structure can be spoken of.

In practice, in the thin film form, the AC structure has given better results than DC structure both regarding the optical performance and regarding the durability. Within the prior art technique, as the best embodiment may be considered the AC structure published by Sharp Corporation (T. Inoguchi et al., *Journal of Electronic Engineering,* 44, October 74), which structure has been accomplished as a so-called dual-insulation structure (M, J. Russ, D. I. Kennedy. J. Electrochem. Soc., 114, 1066 (1967)) wherein there is a dielectric layer on both sides of the zinc sulfide layer. A drawback of the dual-insulation structure is that the voltage remaining across the two insulations increases the operating voltage of the overall structure. A high operating voltage is a detrimental factor in particular in view of the control electronics controlling the electroluminescence component.

The basis of the present invention is an observation to the effect that the service life of electroluminescence is affected considerably by the chemical interactions between the zinc sulfide, on one hand, and the electrodes or the materials outside the electrodes, on the other hand. The function of the insulation in the electroluminescence structure is consequently not only to prevent an electric break-through, but also to prevent chemical interaction between the zinc sulfide and the environment, which is achieved by means of most dielectric materials as a result of the low mobility of ions. The relatively good results obtained with the dual-insulation structures are, in respect of the service life properties, mainly accounted for by the circumstance that the dielectric layers provided as current limiters also function as chemical barriers between the zinc sulfide and the environment.

The structure in accordance with the present invention is based on the idea that it is possible to separate the functions of a chemical barrier and a current limitation from each other, whereby the production of the chemical protection in itself takes place without voltage losses, in other words, with a material whose electrical conductivity is essentially higher than the electrical conductivity of the current limiter. More specifically, the structure according to the present invention is characterized in that a first and a second additional layer structure having a chemically protecting function are disposed between both electrode layers and the luminescence layer, and a third additional layer structure having a current limiting function is disposed substantially only between the second electrode layer and the luminescence layer.

In other words, the electroluminescence structure in accordance with the invention is characterized in that there is a layer functioning as a chemical barrier on both sides of the zinc sulfide film, whereas there is a current limiting function only on one side, either as a separate resistive or dielectric layer or as integrated in the material layer constituting the chemical barrier.

An important embodiment of the invention is characterized in that a rather thin additional insulating layer, functioning as a transition layer, is disposed at least on one side of the luminescence layer.

On the other hand, another important embodiment of the invention is characterized in that the luminescence layer is on one side limited by an electrically insulating chemical protective layer and on the other side by a combination of layers consisting of a rather thin additional insulation layer, functioning as a transition layer, and of an electrically conductive chemical protective layer.

By means of the invention, remarkable advantages are achieved. Thus, by separating the conductive protective layer and the current limiting layer, it has been possible to make the electroluminescence structure more simple. Moreover, by disposing a very thin $Al_2O_3$ layer at one boundary surface of the luminescence layer, good emission of light has been achieved irrespective of the instantaneous direction of the current. In other words, owing to this additional layer, symmetry of the emission of light has been achieved in the luminescence structure. The structure in accordance with the invention can still be applied both to AC and to DC operation.

The invention will be examined below in more detail with the aid of the exemplifying embodiments in accordance with the attached drawings.

Figure 4:
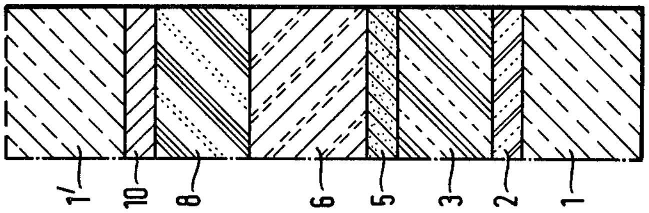
Figure 7:
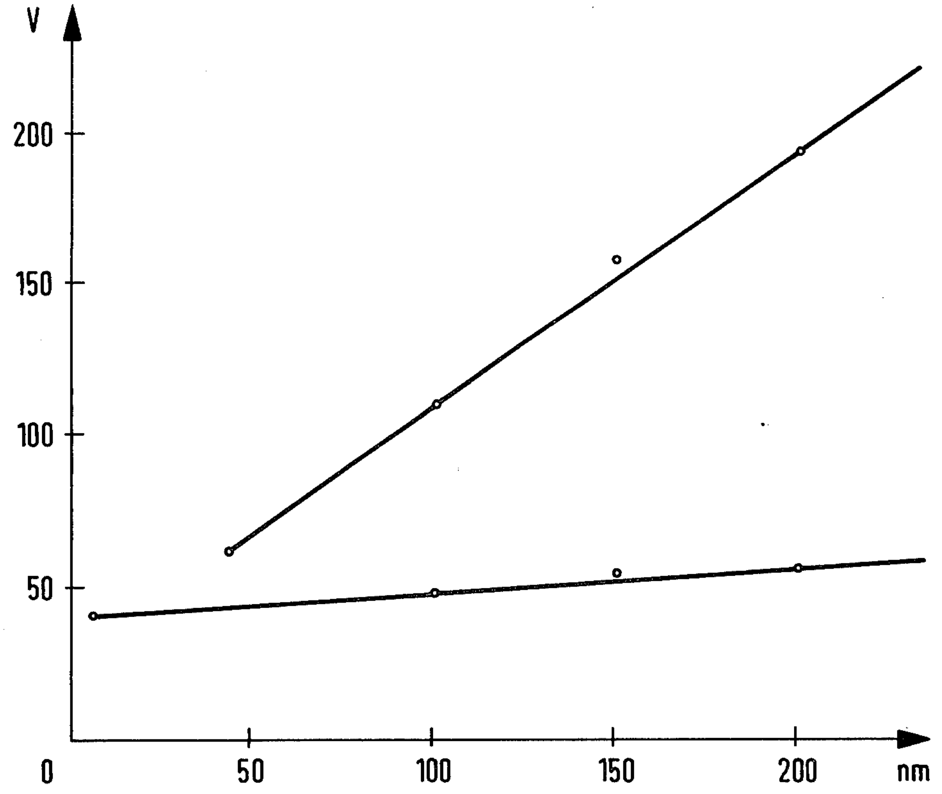

FIG. 7 indicates the ignition and destruction voltages of the structure shown in FIG. 4 as a function of the thickness of the protective layer.

Figure 8:
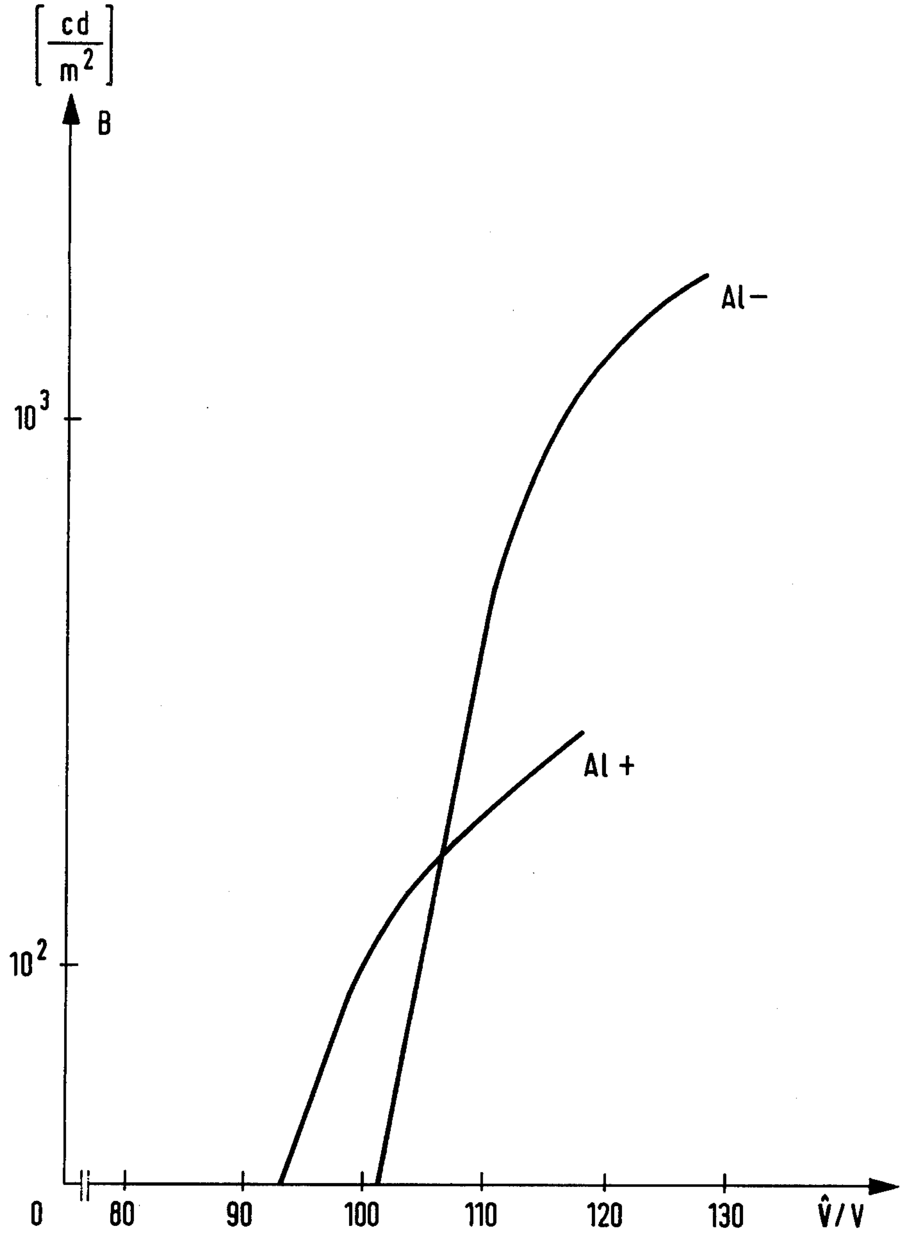

FIG. 8 shows the DC voltage-brightness curve of a structure in accordance with the invention.

Figure 1:
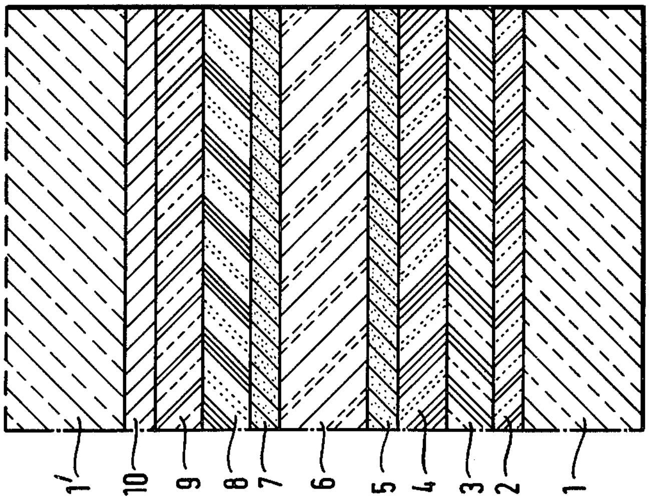

FIG. 1 shows an electroluminescence structure in accordance with the invention, intended for AC operation, in its commonest form. Therein, onto a base or substrate layer 1, e.g., of glass, have been disposed, one after the other, a first electrode layer 2, a first electrically conductive chemical protective layer 3, a first chemical protective layer 4 of a dielectric material, a first rather thin additional insulation layer 5, functioning as a transition layer, the luminescence layer 6 proper, a second additional insulation layer 7, a second dielectric protective layer 8, a second conductive protective layer 9, and a second electrode layer 10. By means of broken lines, a substrate layer 1' is presented as alternatively disposed on the opposite side of the structure.

The first additional layer structure 3, 4, consisting of the layers 3 and 4, and correspondingly the second additional layer structure 8, 9, consisting of the layers 8 and 9, have the function of chemical protection. The layers 4 and 8, which form the inner part of the first and second additional layer structure 3, 4 and 8, 9, respectively, have the function of current limiter.

Figure 2:
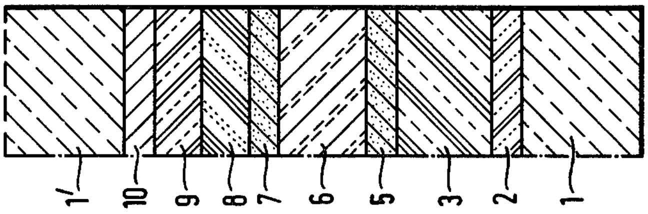

The structure shown in FIG. 2 is similar to that shown in FIG. 1 except that it lacks the first dielectric protective layer 4.

Figure 3:
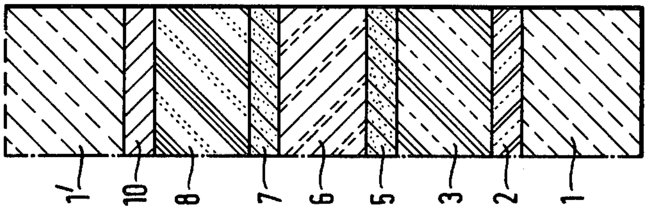

The structure shown in FIG. 3 is similar to that shown in FIG. 2 except that it lacks the second conductive protective layer 9.

The structure shown in FIG. 4 is similar to that shown in FIG. 3 except that it lacks the second additional insulation layer 7.

Figure 5:
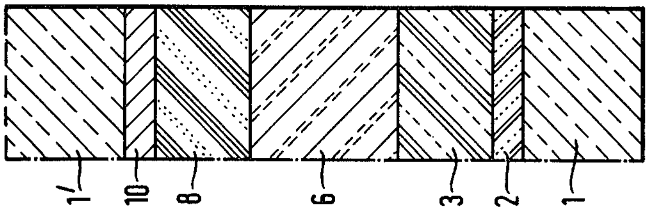
FIGS. 1 to 5 are partly schematical sectional views of various embodiments of the electroluminescence structure in accordance with the invention.

The structure shown in FIG. 5 is similar to that shown in FIG. 4 except that it also lacks the first additional insulation layer 5.

Below, the structure in accordance with FIG. 4 will be examined in more detail, which structure illustrates some sort of an optimum solution. The choices of materials and dimensionings applied in this structure are, however, also applicable to the structures in accordance with FIGS. 1 to 3 and 5.

Thus, in the structure in accordance with FIG. 4, one protective layer of a dielectric material (4 in FIG. 1) has been substituted by an electrically conductive chemical protective layer 3.

The mixed insulation used in the layer 8, tantalum-titanium oxide (TTO), on the other hand, functions both as an electric insulation, so-called current limiter layer, and as an upper chemical protection.

The titanium oxide ($TiO_2$) used in the layer 3 and having an appropriate electrical conductivity, functions as a chemical separator of the lower electrode 2 and the zinc sulfide in the luminescence layer 6. Between the titanium oxide and the zinc sulfide there is a very thin layer 5 of aluminium oxide, which has certain properties improving the luminescence but which does not function as an electrical protection to a major extent.

As the current limiting layer and the conductive chemical protective layer are in this way separated from each other, the various layer thicknesses may be optimized in respect of each property separately.

Figure 6:
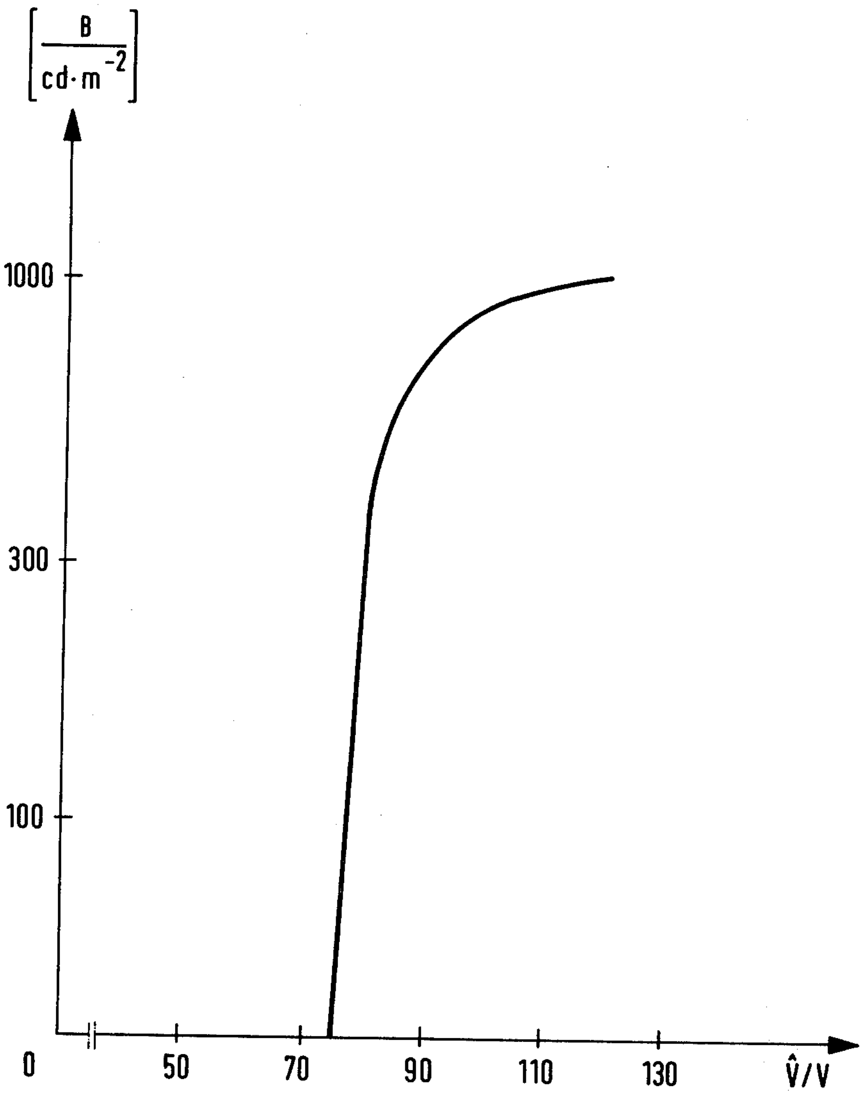
FIG. 6 shows the AC voltage-brightness curve of the structure shown in FIG. 4.

FIG. 6 shows a typical voltage-brightness curve. From the curve it is noticed that the operating voltage has been lowered to a level below 100 Vp. Owing to the good current limitation, the voltage marginal is very high. According to accelerated service life tests, the chemical stability is good.

The layers 3, 5, 6, and 8 have been grown by means of the so-called ALE method (Atomic Layer Epitaxy). The ITO (indium-tin oxide) films 2 and 10 have been grown by means of reactive sputtering.

The substrate 1 may be either an ordinary soda-lime glass or sodium-free glass, e.g. Corning 7059.

Against the substrate there is a transparent conductor, e.g., indium-tin oxide (ITO), layer 2.

The layer 3 is made of titanium oxide ($TiO_2$). The specific resistance of the film is $10^3$ to $10^5 \Omega cm$. It limits the thickness of the titanium oxide film to the level below 100 nm in structures in which the bottom structure ITO 2 is figured. This is so because there is a desire to keep the lateral conductivity at a low level in order that the edge of the bottom figure should remain sharp. When there is an integrated bottom conductor 2, this requirement does not apply, because the precision of the figure is determined by the surface conductor 10.

It follows from the fairly good conductivity of titanium oxide that there remains no voltage across the film, which gives a certain advantage. Impurities diffused from the substrate glass 1 do not affect the electrical properties of titanium oxide, unlike those of insulating layers. Nor does titanium oxide have an electric field promoting diffusion.

Titanium oxide is chemically very stable, for example its etching is very difficult.

Between the zinc sulfide and titanium oxide layers, 6 and 3, respectively, there is a very thin layer 5 of aluminium oxide. This layer has three functions: It forms a stable growing substrate for the zinc sulfide, and at the same time a good injection boundary surface is obtained against zinc sulfide. Additionally, it may prevent the passage of low-energy electrons through the structure.

On the other hand, aluminium oxide as an insulation material increases the operating voltage of the structure. This is why attempts are made to make the $Al_2O_3$ layer 5 as thin as possible, however, so that the desired good properties are obtained.

The active luminescence layer 6 is zinc sulfide which is alloyed with manganese. The thickness of the zinc sulfide layer determines the ignition voltage and, in AC operation, also the maximum brightness. Both of these factors are increased with an increasing thickness of the zinc sulfide layer.

When these aspects opposed to each other are being adapted to each other, a compromise must be made in the determination of the thickness of the zinc sulfide layer 6. Now conclusion has been reached for a zinc sulfide layer thickness of about 300 nm.

Immediately on the zinc sulfide layer 6 there is a tantalum-titanium oxide layer 8. For this the abbreviation TTO is used.

The TTO has been grown by using the pulse ratio Ta:Ti=2:1. Other pulse ratios have also been experimented with. The margin at which TTO is converted from an insulator of the type of $Ta_2O_5$ into a non-insulator of the type of $TiO_2$ is very sharp. When one remains on either side of the margin, the pulse ratio of the preparation process does not seem to have a gradual effect on the properties of the film.

TTO is very similar to $Ta_2O_5$. As the dielectric coefficient of TTO has been recorded 20 at a recording frequency of 1 kHz. As the value of a break-through field of TTO has been recorded 7 MV $cm^{-1}$. This value is the same as with the best $Ta_2O_5$ films. However, when thin-film structures are concerned, other circumstances also affect the break-through frequency besides the bulk properties of the material. Thin sections or crystallisation properties of the film are most frequently responsible for the destruction of a film before total bulk break-through. In this respect the TTO thin film differs from the $Ta_2O_5$ thin film.

When a TTO layer is used as current limiter in a luminescence structure, a remarkable marginal of operating voltages is obtained. FIG. 7 shows the ignition voltage and destruction voltage of a luminescence structure in accordance with FIG. 4 as a function of the thickness of the TTO layer. The high toleration of excessive voltages gives evidence on electrical reliability of the structure.

Within the scope of the invention, it is possible also to conceive of solutions differing from the exemplifying embodiments described above. Thus, the TTO may also be placed underneath the zinc sulfide layer 6, or it may be divided and placed on both sides of the zinc sulfide layer. In the latter case the thickness of one insulation layer can, however, not be half the thickness of a one-sided insulation, because the density of pinholes in an insulation is highly dependent on the thickness of the film. Making the film thinner increases the density of pinholes. If an electrical marginal is supposed to be maintained, the total thickness of two-sided insulations is double the thickness of a one-sided insulation. This again causes an increase in the operating voltage.

A titanium oxide layer may also be placed on top of the TTO layer if it is desirable to improve the chemical durability.

An $Al_2O_3$ layer 5 may also be disposed between the zinc sulfide and TTO layers. In certain cases, the layer 5 may also be omitted entirely (FIGS. 5 and 6).

As to other alternatives, it should be mentioned that the insulating protective layer 8 may also be made of barium-titanium oxide ($Ba_xTi_yO_z$) or of lead-titanium oxide ($PbTiO_3$).

The thickness of the dielectric protective layer may be, e.g., 100 to 300 nm, preferably about 250 nm.

The conductive protective layer 3 may also be made of tin oxide ($SnO_2$).

The thickness of the conductive protective layer 3 may be 50 to 100 nm, preferably about 70 nm.

The additional insulation layer 5 (or 7) functioning as a transition layer may also be made of tantalum-titanium oxide, and its thickness may be, e.g., 5 to 100 nm, preferably about 20 nm.

So far, the structure according to this invention has been studied mainly as an AC application. Is should, however, be observed that the structure according to the invention also functions with DC voltage. This implies that the layer or layers having a current limiting function have a resistive character.

In the following the structure according to FIG. 4 is considered as a DC application. Then the layers 1, 2, 3, 5, and 6 can be as already described. The protective layer 8 of a resistive material can also be made of tantalum-titanium oxide (TTO) as described and its thickness can be, e.g., 200 to 300 nm, preferably about 250 nm.

As a second alternative should be mentioned that the resistive material of the chemically protective layer is $Ta_2O_5$ and the thickness of the layer is 50 to 1000 nm, preferably about 100 nm.

The second electrode layer 10 can be made of aluminium.

In FIG. 8 the voltage-brightness curves of the above described structure is presented as measured with 1 kHz 10 percent DC pulses.

What we claim is:

1. A thin film structure including a substrate layer, said structure further comprising:

first and second electrode layers;

a luminescence layer disposed between the first and second electrode layers;

a first chemically protective layer made of an electrically conductive material and disposed between the luminescence layer and the first electrode layer in direct contact with the latter, and having a thickness of the order of about 50 to 1000 nm; and a second chemically protective and current limiting layer made of a material selected from the group consisting of tantalum-titanium oxide (TTO), barium-titanium oxide ($Ba_xTi_yO_z$), lead-titanium oxide ($PbTiO_3$), and $Ta_2O_5$ and disposed between and in direct contact with the luminescence layer and the second electrode layer and having a thickness of the order of about 50 to 1000 nm, preferably about 100 to 300 nm.

2. An electroluminescence structure as claimed in claim 1, wherein the electrically conductive first protective layer is made of a material selected from the group consisting of $TiO_2$ and $SnO_2$.

3. An electroluminescence structure as claimed in claim 2, wherein the electrically conductive first protective layer is made of $TiO_2$ and the thickness of this layer is 50 to 100 nm, preferably about 70 nm.

4. A structure as claimed in claim 1, further comprising a transition layer made of an insulating material selected from the group consisting of $Al_2O_3$ and tantalum-titanium oxide, and disposed between and in direct contact with the luminescence layer and the electrically conductive first chemically protective layer, and having a thickness of the order of about 5 to 100 nm, preferably about 20 nm.

5. An electroluminescence structure as claimed in claim 4, wherein the electrically conductive first protective layer is made of a material selected from the group consisting of $TiO_2$ and $SnO_2$.

6. An electroluminescence structure as claimed in claim 5, wherein the electrically conductive first protective layer is made of $TiO_2$ and the thickness of this layer is 50 to 100 nm, preferably about 70 nm.

* * * * *

UNITED STATES PATENT AND TRADEMARK OFFICE
CERTIFICATE OF CORRECTION

PATENT NO. : 4,416,933

DATED : November 22, 1983

INVENTOR(S) : JORMA ANTSON, ET AL.

It is certified that error appears in the above-identified patent and that said Letters Patent is hereby corrected as shown below:

Column 1, line 56, change "structute" to --structure--;
line 57, change "In" to --If--.

Column 2, line 1, change "M," to --M.--.

Column 6, line 2, change "Is" to --It--;
line 14, after "alternative" insert --it--.

Signed and Sealed this

*First* Day of *May 1984*

[SEAL]

*Attest:*

GERALD J. MOSSINGHOFF

*Attesting Officer* *Commissioner of Patents and Trademarks*